US005603104A

United States Patent [19]

Phelps, III et al.

[11] Patent Number: 5,603,104

[45] Date of Patent: Feb. 11, 1997

[54] LCD SYSTEM WITH INTEGRATED ANNUNCIATOR

[75] Inventors: William C. Phelps, III, Plantation; Dwayne A. Daggs, Sunrise; Armando Gonzalez, Miami; Masaru Tokiyama, Coral Springs, all of Fla.

[73] Assignee: Motorola, Inc., Schaumburg, Ill.

[21] Appl. No.: 518,475

[22] Filed: Mar. 21, 1995

Related U.S. Application Data

[63] Continuation of Ser. No. 33,927, Mar. 18, 1993, abandoned.

[51] Int. Cl.$^6$ .......... H04B 1/40

[52] U.S. Cl. .......... 455/90; 455/159.2; 345/88

[58] Field of Search .......... 455/89, 90, 150.4, 455/159.1, 159.2, 226.4, 157.2, 154.1; 345/38–40, 50, 87–88; 340/286.11, 815.43, 815.45, 815.56, 815.65, 815.66, 815.67; 362/27, 29

[56] References Cited

U.S. PATENT DOCUMENTS

| | | | |
|---|---|---|---|
| 3,419,857 | 12/1968 | Martin | 345/83 |
| 4,410,887 | 10/1983 | Stolov et al. | 345/50 |
| 4,514,920 | 5/1985 | Shafrir et al. | 345/50 |
| 4,617,562 | 10/1986 | Klotz | 345/38 |
| 4,727,353 | 2/1988 | Ruhter | 340/815.67 |
| 4,922,239 | 5/1990 | Kugo et al. | 345/38 |
| 4,965,564 | 10/1990 | Fabry et al. | 345/88 |
| 5,063,379 | 11/1991 | Fabry et al. | 345/88 |
| 5,115,182 | 5/1992 | Ehmke et al. | 455/89 |
| 5,233,338 | 8/1993 | Surguy | 345/88 |
| 5,245,652 | 9/1993 | Larson et al. | 379/98 |

*Primary Examiner*—Reinhard J. Eisenzopf
*Assistant Examiner*—Nguyen Vo
*Attorney, Agent, or Firm*—Andrew S. Fuller

[57] ABSTRACT

A display system (100) includes a liquid crystal display (140) which incorporates annunciator areas (142). Each annunciator area (142) has an aperture (146,147,148), independently controlled, to allow the passage of light through the annunciator area (142). Independently controlled illumination (160,210,212,214) is positioned behind each annunciator area (142). The passage of light through each annunciator area (142) is controlled by opening and closing the aperture (146,147,148).

7 Claims, 2 Drawing Sheets

LCD SYSTEM WITH INTEGRATED ANNUNCIATOR

This is a continuation of application Ser. No. 08/033,927, filed Mar. 19, 1993, and now abandoned.

TECHNICAL FIELD

This invention relates in general to liquid crystal displays and in particular to an LCD annunciator arrangement.

BACKGROUND

The present invention is related to the incorporation of annunciators into a liquid crystal display (LCD) assembly. Traditionally, such annunciators were housed in modules separate from the LCD assembly. However, the incorporation of annunciators into the LCD assembly has been pursued because of a demand for a more efficient use of available space as a result of product miniaturization, and because of the desire to centralize information devices.

There exist inherent problems with closely spaced and separately controlled annunciators which use color to convey additional information. The inherent problems include poor contrast when these annunciators are viewed in direct sunlight or bright ambient light. This is commonly termed "color washout." This problem is particularly acute when light emitting diodes are used to provide back lighting. Color washout may be partially addressed by using a reflector positioned on the rear of the LCD, colored to reflect the desired color for the annunciator, in conjunction with incandescent lamps for back lighting. Color contrast is improved but other problems persisted.

One such problem exist when the annunciators are viewed in low light. Light intended for a particular annunciator must be specifically targeted to that annundator display area to avoid inadvertent illumination of adjacent annunciators. This problem is commonly known as "color bleeding." Color bleeding also can occur from back lighting needed to view the main portion of the LCD. Additionally, it is desirable to use light emitting diode, rather than an incandescent lamp for back lighting, as the former is more reliable and has a longer life.

Thus, a LCD system which incorporates annunciators, and which provides sharp contrast in bright light, while producing similarly sharp images in low light, was long desired in the art. Furthermore, the use of light emitting diodes for back lighting was very desirable because of the relative low manufacturing cost, better reliability, and longer life, of light emitting diodes versus incandescent lamps.

SUMMARY OF THE INVENTION

The invention is a display system including a liquid crystal display which incorporates annunciator areas. These annunciator areas comprise controllable apertures for controlling passage of light through each annunciator areas and light blocking means for selectively closing the apertures in response to a first control signal. Each annunciator is independently lighted by illuminator means positioned behind each annunciator area. The passage of light generated by the illuminator means is controlled by closing the apertures through the light blocking means.

DETAILED DESCRIPTION OF THE PREFERRED EMBODIMENT

Figure 1:
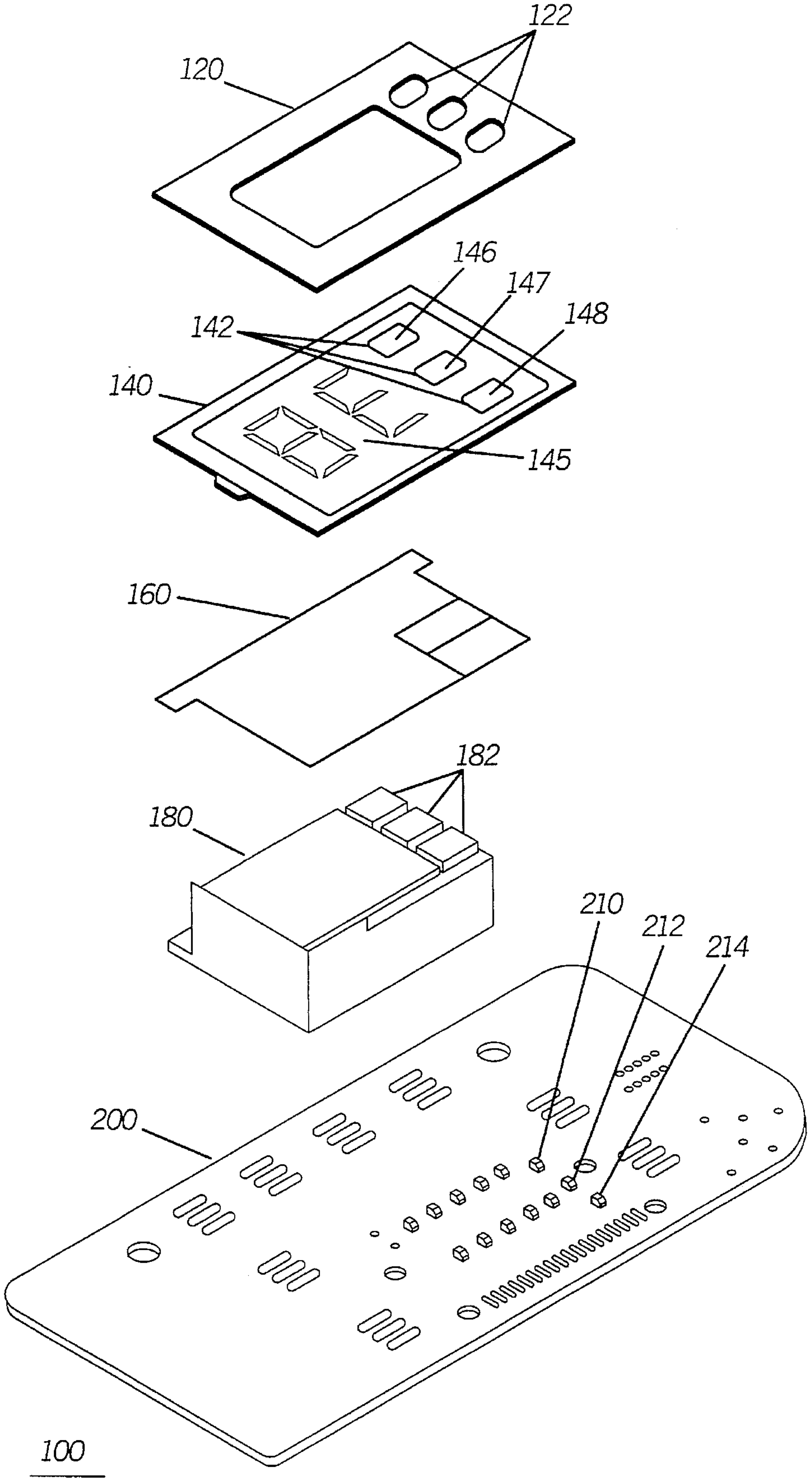
FIG. 1 is an exploded perspective view of a LCD system with integrated annunciators.

While the specification concludes with claims defining the features of the invention that are regarded as novel, it is believed that the invention will be better understood from a consideration of the following description in conjunction with the drawing figures, in which like reference numerals are carried forward.

Referring to FIG. 1, the LCD 140 is generally flat and planar with a two character display in the main display area 145, and annunciator areas 142 positioned adjacent to the main display area 145. The LCD 140 is light transmissive, i.e., light is able to pass through the body of the LCD 140. Liquid crystal displays are often implemented such that characters or other symbols are displayed using a positive display image, i.e., the general background on the liquid crystal display reflects ambient light while particles activated within the liquid crystal display blocks the reflection of light in the shape of the desired characters or symbols. Thus, the characters or symbols appear dark or black to a user. The LCD 140 has a negative display image, i.e., the general background does not reflect light. When characters or symbols are to be displayed, particles within the LCD 140 are activated to allow light to pass through the LCD 140 in the shape of the characters or symbols desired. The annunciator areas 142 within the LCD 140 also have a negative image display as described above. The particles within the annunciator areas 142 function as a light blocking means. Other light blocking means, such as a mechanical device behind each annunciator area 142, are possible.

The LCD 140, including the annunciator areas 142, is overlaid with a bezel 120. Annunciator windows 122 are excised on the bezel 120. The bezel 120 is overlaid on the LCD 140 such that the annunciator windows are located over the annunciator areas. The annunciator windows 122 are designed to delineate the desired symbols or characters for the annunciator areas 142. For example, if the characters "Tx" are to be shown as an annunciator, the annunciator window would be excised to allow the passage of light in the shape of "Tx". A separate bezel 120 is not required for this invention. The function of the bezel 120 may be provided by integrally activating particles within the annunciator areas 142 in the shape of the desired symbols, or by applying paint or the like to the LCD 140 to shape the annunciator areas 142.

Figure 2:
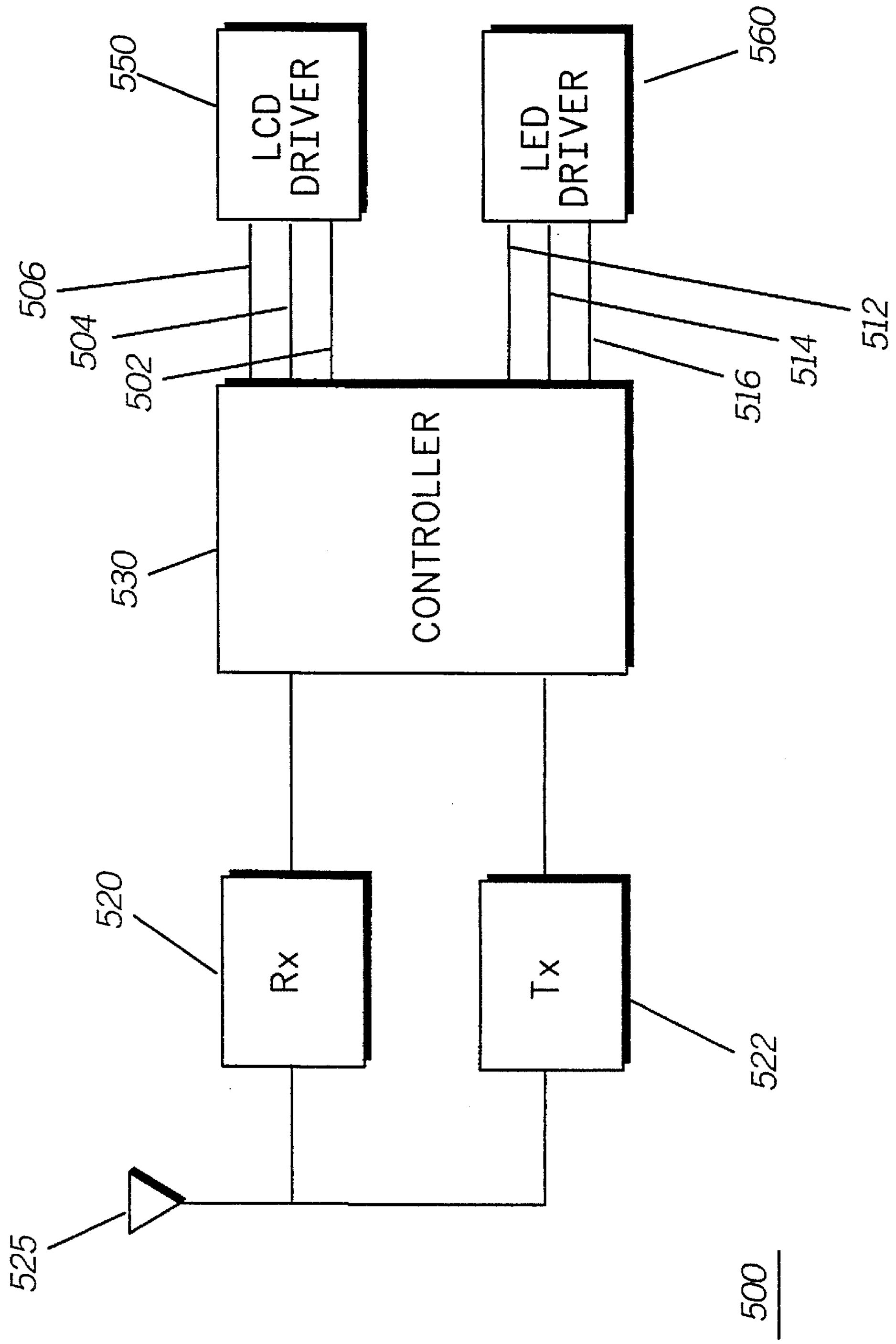
FIG. 2 is a block diagram of a radio incorporating the LCD system with integrated annunciators.

Each annunciator area 142 has a controllable aperture 146,147,148 for controlling passage of light through the annunciator area 142. Referring to FIG. 2, a block diagram of a radio utilizing the LCD system with integrated annunciators is shown. The apertures 146,147,148 can be selectively opened and closed in response to LCD control signals 502,504,506. Thus, the first aperture 146 responds to the first LCD control signal 502, the second aperture 147 responds to the second LCD control signal 504, and so on. The LCD control signals 502,504,506 instruct the LCD driver 550 to activate or deactivate LCD segments (not shown) within the annunciator areas 142.

Referring back to FIG. 1, positioned behind the annunciator areas 142 are light sources 210,212,214, which can independently light each annunciator area 142. The light sources 210,212,214 used are light emitting diodes (LED). However, other light sources such as incandescent lamps are possible. For a multi-colored application, the multi-colored LEDs 210,212,214 are selected to provide the desired color for each annunciator area 142. A lightpipe 180 is used to guide light from each LED 210,212,214 to the targeted annunciator area 142. The lightpipe 180 has individual light guides 182 to reduced undesired light dispersion to other annunciators areas 142, or other areas on the LCD 140.

Referring to FIG. 2, the LED 210,212,214 for each annunciator area 142 is independently controllable and can be turned on and off through LED driver 560. Thus, the first LED 210 responds to first LED control signal 512, the second LED 212 responds to the second LED control signal 514, and so on. The LED control signals 512,514,516 control whether the LED 210,212,214 for each annunciator area 142 is on or off.

A reflector 160 is included to address the problem of poor color contrast for the annunciator area 142 in bright light situations. In this application, the reflector 160 is positioned between the LCD 140 and the lightpipe 180. The reflector 160 is independently colored for each annunciator area 162 and reflects light in the color desired for each annunciator area 142. The reflector 160 also allows the passage of light from the LEDs 210,212,214 through the reflector 160 to the LCD 140. Note that other means of reflecting the desired color in bright light situations are possible. One such means is by painting the reflector directly on the LCD 140.

The light sources 210,212,214, and the reflector 160, are illuminators which can independently light each annunciator area 142. To minimize the inadvertent illumination of adjacent annunciator areas 142, the LCD control signals 502,504,506, and the LED control signals 512,514,516, are synchronized, such that when the aperture 146,147,148 for an annunciator area 142 is closed, the LED 210,212,214 for that annunciator is turned off. Thus, if an annunciator area 142 is not to be illuminated, the first LCD control signal 502 causes the aperture 146 for that annunciator area 142 to close, and the first LED control signal 512 causes the LED 210 for that annunciator area 142 to be turned off. This substantially reduces the problem of "color bleeding" present in the prior art.

The LCD control signals 502,504,506, and the LED control signals 512,514,516 are generated by controller 530 which is programmed to control the overall operation of the radio 500. The radio 500 communicates messages over a radio frequency channel using receiver 520, transmitter 522, and antenna 525.

Thus, two major problems of closely spaced and separately controlled annunciators which use color to convey additional information have been solved. First, the synchronized shuttering of the aperture 146,147,148 for an annunciator area 142 in conjunction with the enabling and disabling of the light source 210,212,214 for that annunciator area 142, addresses the color bleeding problem. Second, the simultaneous use of a color reflector 160 addresses the problem of poor color contrast in bright light situations.

While the preferred embodiments of the invention have been illustrated and described, it will be dear that the invention is not so limited. Numerous modifications, changes, variations, substitutions and equivalents will occur to those skilled in the art without departing from the spirit and scope of the present invention as defined by the appended claims.

We claim:

1. A liquid crystal display system responsive to a plurality of control signals, comprising:

a liquid crystal display including a negative image display annunciator area having a controllable aperture that prevents light from passing through said annunciator area when the controllable aperture is closed, said aperture being responsive to a control signal selected from said plurality of control signals to selectively open and close said aperture; and an illuminator positioned behind the annunciator area, the illuminator being responsive to a control signal selected from said plurality of control signals for turning the illuminator on and off;

wherein the control signal for the controllable aperture is synchronized with the control signal for the illuminator to turn the illuminator on and off when the controllable aperture is opened and closed respectively, such that there is no illumination behind the annunciator area when the controllable aperture is closed.

2. A liquid crystal display system as defined in claim 1, wherein said illuminator comprises a colored light source positioned behind said annunciator area.

3. A liquid crystal display system as defined in claim 2, wherein said colored light source comprises a light emitting diode.

4. A liquid crystal display system as defined in claim 2, further comprising:

a color reflector interposed between said annunciator area and said colored light source; and said color reflector is independently colored for said annunciator area, said color reflector matching the color of said colored light source for said annunciator area.

5. A radio, comprising:

communication means for communicating messages over a radio frequency channel, and for providing a plurality of control signals;

a liquid crystal display including a negative image display annunciator area having a controllable aperture that prevents light from passing through said annunciator area when the controllable aperture is closed, said aperture being responsive to a control signal selected from said plurality of control signals to selectively open and close said aperture; and an illuminator positioned behind the annunciator area, the illuminator being responsive to a control signal selected from said plurality of control signsls for turning the illuminator on and off;

wherein the control signal for the controllable aperture is synchronized with the control signal for the illuminator to turn on and off the illuminator when the controllable aperture is opened and closed respectively, such that there is no illumination behind the annunciator area when the controllable aperture is closed.

6. A liquid crystal display system responsive to a plurality of control signals, comprising:

a liquid crystal display comprising a negative image display portion, the negative display portion including a plurality of controllable apertures for controlling passage of light through said negative image display portion, said apertures being responsive to a first set of control signals selected from said plurality of control signals for selectively opening and closing each of said apertures, wherein the plurality of controllable apertures, when collectively closed, prevents the passage of light through the negative image display portion; and a plurality of light sources corresponding to the plurality of apertures, each light source being positioned behind, so as to independently light, one of said plurality of apertures, the plurality of light sources being responsive to a second set of control signals selected from said plurality of control signals to independently turn each light source on and off;

wherein said first set of control signals and said second set of control signals are synchronized to turn on and off each light source when the corresponding aperture is opened and dosed respectively, such that there is no illumination behind the corresponding aperture when closed.

7. A radio, comprising:

communication means for communicating messages over a radio frequency channel, and for providing a plurality of control signals;

a liquid crystal display comprising a negat/ve image display portion including a plurality of annunciator areas, each annunciator area having a controllable aperture for selectively preventing passage of light therethrough, said apertures being responsive to a first set of control signals selected from said plurality of control signals for selectively opening and closing each of said apertures, wherein the plurality of controllable apertures, when collectively closed, prevents the passage of light through the negative image display portion; and a plurality of light sources corresponding to the plurality of apertures, each light source being positioned behind, so as to independently light, one of said plurality of annunciator areas, the plurality of light sources being responsive to a second set of control signals selected from said plurality of control signals to independently turn each light source on and off;

wherein said first set of control signals and ssid second set of control signals are synchronized to turn on and off each light source when the corresponding aperture is opened and closed respectively, such that there is no illumination behind the corresponding aperture when closed.

* * * * *